(12) United States Patent
Butzmann et al.

(10) Patent No.: US 9,276,427 B2
(45) Date of Patent: Mar. 1, 2016

(54) METHOD FOR STARTING UP A BATTERY SYSTEM HAVING A DC VOLTAGE INTERMEDIATE CIRCUIT

(75) Inventors: Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 13/825,118

(22) PCT Filed: Aug. 12, 2011

(86) PCT No.: PCT/EP2011/063965
§ 371 (c)(1),
(2), (4) Date: Jul. 9, 2013

(87) PCT Pub. No.: WO2012/038153
PCT Pub. Date: Mar. 29, 2012

(65) Prior Publication Data
US 2013/0293196 A1    Nov. 7, 2013

(30) Foreign Application Priority Data

Sep. 20, 2010   (DE) .......................... 10 2010 041 029

(51) Int. Cl.
*H02J 7/00*    (2006.01)
*B60L 3/00*    (2006.01)
(Continued)

(52) U.S. Cl.
CPC ................. *H02J 7/0063* (2013.01); *B60L 3/00* (2013.01); *B60L 11/1864* (2013.01);
(Continued)

(58) Field of Classification Search
CPC ..... H02J 7/0013; H02J 7/0014; H02J 7/0016; H02J 7/0019; H02J 7/0022; H02J 7/0024; H02J 7/0027; Y02T 10/7055; Y02T 10/7061; Y02T 10/7066; Y02T 10/7077; Y02T 10/72; Y02T 10/7208; Y02T 10/7216; Y02T 10/7258; Y02T 10/7283
USPC .................................. 320/103–104, 119–122
See application file for complete search history.

(56) References Cited

U.S. PATENT DOCUMENTS

| 4,375,593 | A | 3/1983 | Winterbotham |
| 5,670,861 | A | 9/1997 | Nor |

(Continued)

FOREIGN PATENT DOCUMENTS

| CN | 101141079 A | 3/2008 |
| DE | 481 891 | 9/1929 |
| DE | 694 30 855 T2 | 12/2002 |
| EP | 2 061 116 A1 | 5/2009 |

OTHER PUBLICATIONS

International Search Report corresponding to PCT Application No. PCT/EP2011/063965, mailed Oct. 27, 2011 (German and English language document) (5 pages).

*Primary Examiner* — Stacy Whitmore
(74) *Attorney, Agent, or Firm* — Maginot, Moore & Beck LLP

(57) ABSTRACT

The disclosure presents a method for starting up a battery system having a battery and a DC voltage intermediate circuit which is connected to the battery. The battery has a plurality of battery modules which are connected in series and which comprise a first battery module having a first number of battery cells and at least a second battery module having a larger second number of battery cells. At the beginning of the method, all of the battery modules are deactivated, and therefore the output voltage of the battery is zero. During the course of the method, the output voltage of the battery is increased by successive second battery modules being activated. In the process, the first battery module is activated in each case between the activation of two second battery modules and is deactivated again when the further second battery module is activated.

8 Claims, 6 Drawing Sheets

(51) Int. Cl.
  *B60L 11/18* (2006.01)
  *H01M 10/44* (2006.01)
  *H01M 16/00* (2006.01)

(52) U.S. Cl.
  CPC .......... *H01M 10/441* (2013.01); *H02J 7/0013* (2013.01); *B60L 2270/20* (2013.01); *H01M 16/00* (2013.01); *H02J 7/0014* (2013.01); *H02J 7/0016* (2013.01); *H02J 7/0019* (2013.01); *H02J 7/0022* (2013.01); *H02J 7/0024* (2013.01); *H02J 7/0027* (2013.01); *Y02T 10/7005* (2013.01); *Y02T 10/7011* (2013.01); *Y02T 10/7055* (2013.01); *Y02T 10/7061* (2013.01); *Y02T 10/7066* (2013.01); *Y02T 10/7077* (2013.01); *Y02T 10/72* (2013.01); *Y02T 10/7208* (2013.01); *Y02T 10/7216* (2013.01); *Y02T 10/7258* (2013.01); *Y02T 10/7283* (2013.01)

(56) References Cited

U.S. PATENT DOCUMENTS

| | | | |
|---|---|---|---|
| 6,140,799 A | 10/2000 | Thomasson | |
| 6,317,343 B1 | 11/2001 | Okamura et al. | |
| 7,638,974 B2 * | 12/2009 | Maleus | 320/119 |
| 8,063,609 B2 * | 11/2011 | Salasoo et al. | 320/134 |
| 8,342,103 B2 * | 1/2013 | Barbee et al. | 105/50 |
| 2005/0023054 A1 | 2/2005 | Weidenheimer et al. | |
| 2007/0252562 A1 * | 11/2007 | Montanya Silvestre | 323/233 |
| 2008/0054870 A1 | 3/2008 | Kosaka et al. | |
| 2008/0197810 A1 | 8/2008 | Ishikawa et al. | |
| 2009/0230766 A1 | 9/2009 | Miyama et al. | |
| 2010/0019718 A1 * | 1/2010 | Salasoo et al. | 320/103 |
| 2011/0234165 A1 * | 9/2011 | Palatov | 320/119 |
| 2012/0268058 A1 * | 10/2012 | Enoki | 320/104 |

* cited by examiner

METHOD FOR STARTING UP A BATTERY SYSTEM HAVING A DC VOLTAGE INTERMEDIATE CIRCUIT

This application is a 35 U.S.C. §371 National Stage Application of PCT/EP2011/063965, filed on Aug. 12, 2011, which claims the benefit of priority to Serial No. DE 10 2010 041 029.2, filed on Sep. 20, 2010 in Germany, the disclosures of which are incorporated herein by reference in their entirety.

The present disclosure relates to a method for starting up a battery system having a DC voltage intermediate circuit and to a battery and a battery system having a DC voltage intermediate circuit that are embodied to perform the starting up method.

BACKGROUND

It has become apparent that in future both in the case of stationary applications and also in the case of vehicles such as hybrid vehicles and electric vehicles battery systems are being used ever more frequently. In order to be able to meet a respective application's particular requirements for voltage and for the power that can be made available, a high number of battery cells are connected in series. Since it is necessary for the current that is provided by a battery of this type to flow through all the battery cells and a battery cell can only carry a limited amount of current, battery cells are in addition often connected in parallel in order to increase the maximum current. This can be achieved either by providing a plurality of battery packs within a battery cell housing or by connecting battery cells externally.

FIG. 1 illustrates the schematic diagram of a conventional electric drive system, such as is used for example in electric vehicles and hybrid vehicles or also in stationary applications such as when adjusting rotor blades of wind power plants. A battery 110 is connected to a DC voltage intermediate circuit and said DC voltage intermediate circuit is embodied by a capacitor 111. A pulse-controlled inverter 112 is connected to the DC voltage intermediate circuit and sinusoidal voltages that are phase-offset with respect to each other for operating an electric drive motor 113 are supplied by said pulse-controlled inverter 112 to three outputs by way of in each case two switchable semi-conductor gates and two diodes. The capacity of the capacitor 111 that forms the DC voltage intermediate circuit must be sufficiently large in order to stabilize the voltage in the DC voltage intermediate circuit for a period of time in which one of the switchable semi-conductor gates is switched to conduct. In a practical application, such as an electric vehicle, a high capacity in the mF range is achieved.

FIG. 2 illustrates the battery 110 of FIG. 1 in a detailed block diagram. A plurality of battery cells is connected in series and optionally in addition in parallel in order to achieve a battery capacity and a high output voltage required for a respective application. A charging and disconnecting device 116 is connected between the positive pole of the battery cells and a positive battery terminal 114. Optionally, a disconnecting device 117 can in addition be connected between the negative pole of the battery cells and a negative battery terminal 115. The disconnecting and charging device 116 and the disconnecting device 117 comprise in each case a switch 118 or 119 respectively, which switches are provided for disconnecting the battery cells from the battery terminals in order to disconnect the battery terminals from the voltage supply. Otherwise, as a result of the high DC voltage of the battery cells that are connected in series, there is a considerable potential risk for maintenance personnel or the like. A charging switch 120 having a charging resistor 121 that is connected in series to the charging switch 120 is in addition provided in the charging and disconnecting device 116. The charging resistor 121 limits a charging current for the capacitor 111 if the battery is connected to the DC voltage intermediate circuit. For this purpose, the switch 118 is initially left open and only the charging switch 120 is closed. If the voltage at the positive battery terminal 114 achieves the voltage of the battery cells, the switch 119 can be closed and if necessary the charging switch 120 can be opened.

The charging switch 120 and the charging resistor 121 represent a significant amount of additional expenditure in applications in which the output is in the range of a few 10 kW and said additional expenditure is only required for the process that lasts a few hundred milliseconds for charging the DC voltage intermediate circuit. Said components are not only expensive but they are also large and heavy which is particularly troublesome when used in mobile applications such as electric motor vehicles.

SUMMARY

It is therefore proposed in accordance with the disclosure to provide a method for starting up a battery system having a battery, a DC voltage intermediate circuit that is connected to the battery, and a drive system that is connected to the DC voltage intermediate circuit. The battery comprises a plurality of battery modules that are connected in series and comprise in each case a coupling unit and at least one battery cell that is connected between a first input and a second input of the coupling unit. The plurality of battery modules comprises a first battery module having a first number of battery cells and at least a second battery module having a second number of battery cells, said second number of battery cells being greater than the first number of battery cells. The method comprises at least the following steps:
  a) Disconnect the battery cells of all the series-connected battery modules by transmitting a corresponding control signal to the coupling units of the series-connected battery modules;
  b) Provide a bridge on the output side of all the series-connected battery modules so that an output voltage of the battery is zero;
  c) Connect the battery cells of the first battery module and terminate the bridge on the output side of the first battery module by terminating the transmission of the corresponding control signal to the coupling unit of the first battery module;
  d) Connect the battery cells of one of the second battery modules and terminate the bridge on the output side of one of the second battery modules by terminating the transmission of the corresponding control signal to the coupling unit of one of the second battery modules;
  e) Simultaneously with step d) disconnect the battery cells of the first battery module by transmitting a corresponding control signal to the coupling unit of the first battery module and provide a bridge on the output side of the first battery module; and
  f) Repeat steps c) to e) provided that a further second battery module that is bridged on the output side is available.

The method of the disclosure provides the advantage that the output voltage of the battery and consequently also the voltage of the DC voltage intermediate circuit are increased in a step-like manner, so that, owing to the relatively small voltage difference in each increasing step between the output voltage of the battery and the voltage of the DC voltage intermediate circuit, charging currents which are also comparatively small flow in the capacitor of the DC voltage intermediate circuit in order to adjust the voltage of the DC voltage intermediate circuit to the output voltage of the battery. In this manner, the charging switch 120 and the charging resistor 121 of the battery systems of the prior art are redundant and the costs, volume and weight of a battery system that functions in accordance with the disclosure are correspondingly reduced.

The method of the disclosure has in addition the advantage that the DC voltage intermediate circuit can be charged in a shorter period of time. In a battery system having the battery that is illustrated in FIG. 2 and that comprises a charging and disconnecting device 116, the DC voltage intermediate circuit is charged with a characteristic that corresponds to an exponential function with negative exponents until the switch 118 closes. This means, that the maximum charging current flows at the commencement of the charging process so that the voltage of the DC voltage intermediate circuit approaches the value of the output voltage of the battery in an asymptotic manner; said maximum charging current does, however, continue to reduce as the process of charging the DC voltage intermediate circuit proceeds. However, the voltage of the DC voltage intermediate circuit is continuously increased in a step-like manner in accordance with the method of the disclosure, so that said voltage demonstrates a stepped progression that is approximately linear in the middle. The increase of the averaged voltage of the DC voltage intermediate circuit corresponds to the average charging current that is at least approximately constant over the entire charging process, as a consequence of which the first desired operating voltage is achieved correspondingly more rapidly.

In accordance with the disclosure at least two different variants of battery modules that have a different number of battery cells per battery module are provided. A first battery module, of which generally only one is provided, comprises a comparatively smaller number of battery cells than the second battery module. Accordingly, the output voltage of the first battery module is, in itself, comparatively less than that of the second battery module. The amount of the output voltage of a connected battery module determines the initial voltage difference between the output voltage of the battery and the voltage of the DC voltage intermediate circuit and consequently also determines the maximum charging current that flows from the battery into the DC voltage intermediate circuit. Owing to the comparatively lower output voltage of the first battery module; the voltage of the DC voltage intermediate circuit can be increased in smaller steps, so that the maximum charging current also reduces. The disclosure consequently renders it possible for the DC voltage intermediate circuit to be charged by successively connecting the battery modules without the charging switch and charging resistor, however, the expenditure with regard to the switching technology for the coupling units of the battery modules is at the same time minimized because in the second battery modules a coupling unit manages a greater number of series-connected battery cells.

The method preferably comprises an additional step g) of starting up the drive system that is connected to the DC voltage intermediate circuit if the voltage of the DC voltage intermediate circuit achieves a desired operating voltage. The desired operating voltage can be less than a total voltage of all the second battery modules or less than a total voltage of all the second battery modules and the first battery module. In this case, the drive system is started up even before the voltage of the DC voltage intermediate circuit achieves the maximum voltage of the DC voltage intermediate circuit and is operated with reduced output until the first desired operating voltage is achieved.

The steps c) to e) are preferably repeated until the battery cells of all the second battery modules are connected, in other words are connected in series. The maximum output voltage of the battery corresponds to the maximum possible drive output of the drive system.

Generally, the disclosure is not limited to the use of a first battery module and one or more second battery modules. It is also feasible that further battery modules are provided, which battery modules comprise a different number of battery cells and are connected and disconnected in a corresponding pattern until a desired output voltage of the battery and consequently a desired voltage of the DC voltage intermediate circuit is achieved. The first battery module can, for example, comprise n battery cells, a second battery module can comprise 2*n battery cells, a third battery module can comprise 4*n battery cells and a fourth battery module can comprise 8*n battery cells etc. As a consequence, a binary switching pattern can be used, wherein the voltage difference for each switching step is determined by the voltage of the first battery module. In so doing, the number n can also be 1, so that the output voltage of the battery can be adjusted in the minimum number of voltage steps. The control signals for the coupling units can be generated in a binary switching pattern in a simple manner by means of a binary counter.

A second aspect of the disclosure provides a battery comprising a control unit and a plurality of battery modules that are connected in series. Each battery module comprises in so doing a coupling unit and at least one battery cell that is connected between a first input and a second input of the coupling unit. The plurality of battery modules comprises a first battery module having a first number of battery cells and at least a second battery module having a second number of battery cells, said second number of battery cells being greater than the first number of battery cells. The control unit is embodied in accordance with the disclosure for the purpose of performing the method of the first disclosed aspect.

Particularly preferred, that the second number is twice as high as the first number. In this case, the output voltage of the battery can be increased in uniform steps.

The battery cells of the battery modules are preferably lithium-ion battery cells. Lithium-ion battery cells have the advantages of a high cell voltage and high energy content in a given volume.

A further disclosed aspect relates to a battery system having a battery, a DC voltage intermediate circuit that is connected to the battery, and a drive system that is connected to the DC voltage intermediate circuit. In so doing, the battery is embodied in accordance with the aforementioned aspect of the disclosure.

Particularly preferred, that the DC voltage intermediate circuit is in so doing connected directly to the battery, in other words no further components are connected between the battery and the DC voltage intermediate circuit, in particular no charging device, or rather no charging switch and no charging resistor. In the case of embodiments of the battery system, however, it is also possible to connect further components such as current sensors between the battery and the DC voltage intermediate circuit.

The DC voltage intermediate circuit can comprise a capacitor or can be embodied as a capacitor.

A fourth aspect of the disclosure provides a motor vehicle having a battery system in accordance with the aforementioned aspect of the disclosure.

BRIEF DESCRIPTION OF THE DRAWINGS

Exemplary embodiments of the disclosure are explained in detail with reference to the drawings and the description hereinunder, wherein like reference numbers describe like components or components that function in a like manner. In the drawings.

DETAILED DESCRIPTION

Figure 3:
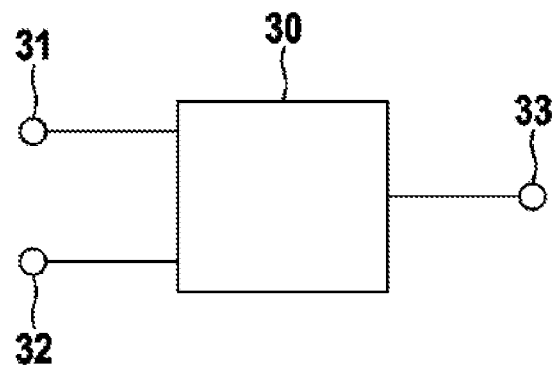
FIG. 3 shows a first embodiment of a coupling unit for use in a battery with which the method in accordance with the disclosure can be performed.

FIG. 3 illustrates a first embodiment of a coupling unit 30 for use in a battery with which the method in accordance with the disclosure can be performed. The coupling unit 30 comprises two inputs 31 and 32 and also an output 33 and is embodied to connect one of the inputs 31 or 32 to the output 33 and to disconnect the other one.

Figure 4:
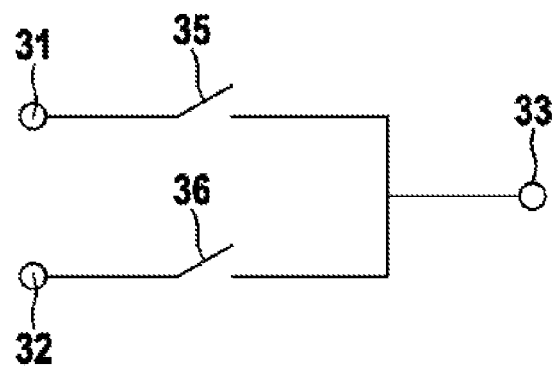
FIG. 4 shows a possible implementation of the first embodiment of the coupling unit with regard to the switching technology.

FIG. 4 illustrates a possible implementation of the first embodiment of the coupling unit 30 with regard to the switching technology, wherein a first and a second switch 35 and 36 respectively are provided. Each of the switches is connected between one of the inputs 31 and 32 respectively and the output 33. This embodiment provides the advantage that it is also possible to disconnect the two inputs 31, 32 from the output 33, so that the output 33 is a high impedance output, which can be useful, for example, in the case of making a repair or carrying out maintenance. In addition, the switches 35, 36 can be embodied simply as semi-conductor switches such as MOSFETs or IGBTs. Semi-conductor switches have the advantage of being favorably priced and providing a high switching rate, so that the coupling unit 30 can react within a comparatively short time period to a control signal and accordingly to a change of control signal.

Figure 5A:
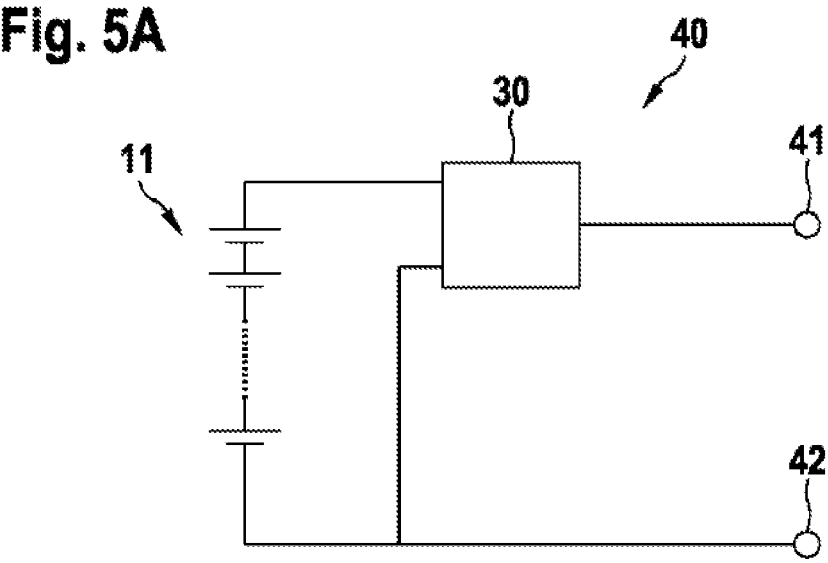
FIGS. 5A and 5B show two embodiments of a battery module having the first embodiment of the coupling unit.
Figure 5B:
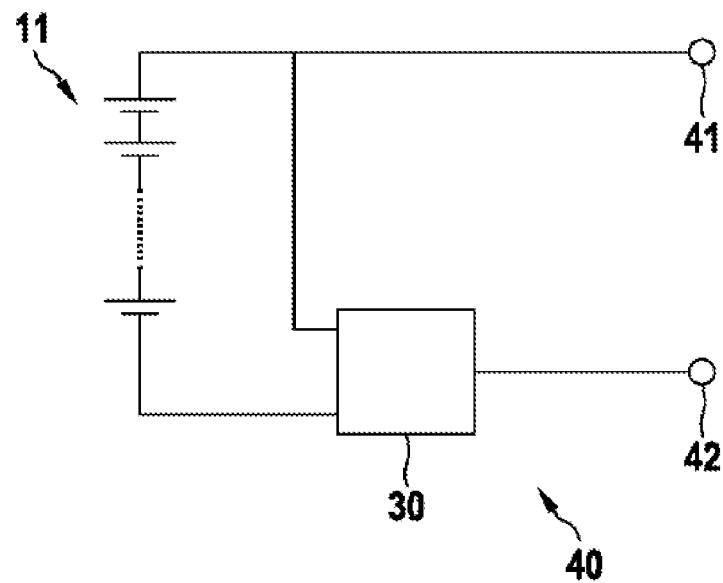

FIGS. 5A and 5B illustrate two embodiments of a battery module 40 having the first embodiment of the coupling unit 30. A plurality of battery cells 11 is connected in series between the inputs of the coupling unit 30. However, the disclosure is not limited to battery cells 11 being connected in series in this manner, it can also provide only one individual battery cell 11 or else a parallel connection or a combination of a series and parallel connection of battery cells 11. In the example illustrated in FIG. 5A, the output of the coupling unit 30 is connected to a first terminal 41 and the negative pole of the battery cells 11 is connected to a second terminal 42. However, an almost minor-inverted arrangement as illustrated in FIG. 5B is possible, wherein the positive pole of the battery cells 11 is connected to the first terminal 41 and the output of the coupling unit 30 is connected to the second terminal 42.

Figure 6:
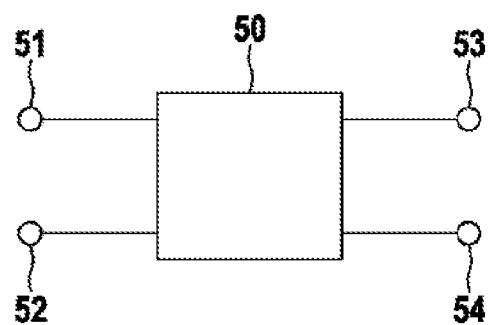
FIG. 6 shows a second embodiment of a coupling unit for use in a battery with which the method in accordance with the disclosure can be performed.

FIG. 6 illustrates a second embodiment of a coupling unit 50 for use in a battery with which the method in accordance with the disclosure can be performed. The coupling unit 50 comprises two inputs 51 and 52 and also two outputs 53 and 54. Said coupling unit is embodied to connect either the first input 51 to the first output 53 and also to connect the second input 52 to the second output 54 (and to disconnect the first output 53 from the second output 54) or else to connect the first output 53 to the second output 54 (and in so doing to disconnect the inputs 51 and 52). In the case of particular embodiments of the coupling unit, said coupling unit can also be embodied to disconnect the two inputs 51, 52 from the outputs 53, 54 and also to disconnect the first output 53 from the second output 54. However, it is not provided that it can also connect the first input 51 to the second input 52.

Figure 7:
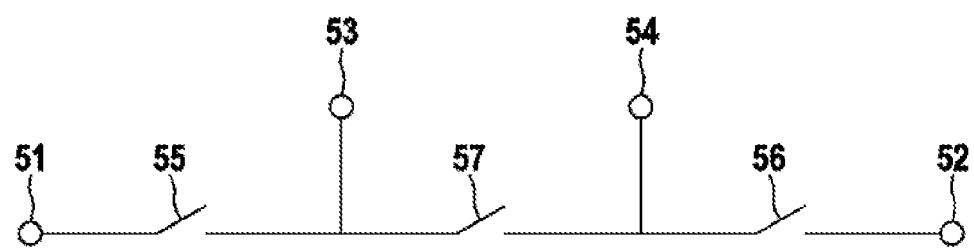
FIG. 7 shows a possible implementation of the second embodiment of the coupling unit with regard to the switching technology.

FIG. 7 illustrates a possible implementation of the second embodiment of the coupling unit 50 with regard to the switching technology, wherein a first, a second and a third switch 55, 56 and 57 are provided. The first switch 55 is connected between the first input 51 and the first output 53; the second switch 56 is connected between the second input 52 and the second output 54 and the third switch 57 is connected between the first output 53 and the second output 54. This embodiment likewise provides the advantage that the switches 55, 56 and 57 can be embodied simply as semiconductor switches such as MOSFETs or IGBTs. Semi-conductor switches have the advantage of being favorably priced and providing a high switching rate, so that the coupling unit 50 can react within a comparatively short time period to a control signal and accordingly to a change of control signal.

Figure 8:
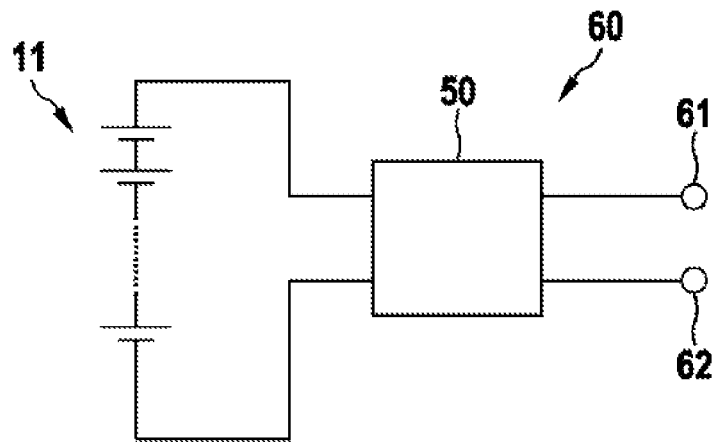
FIG. 8 shows an embodiment of a battery module having the second embodiment of the coupling unit.

FIG. 8 illustrates an embodiment of a battery module 60 having the second embodiment of the coupling unit 50. A plurality of battery cells 11 is connected in series between the inputs of a coupling unit 50. Also this embodiment of the battery module 60 is not limited to battery cells 11 being connected in series in this manner, it can in turn also provide only an individual battery cell 11 or else a parallel connection or a combination of a series and parallel connection of battery cells 11. The first output of the coupling unit 50 is connected to a first terminal 61 and the second output of the coupling unit 40 is connected to a second terminal 62. In comparison to the battery module 40 illustrated in FIGS. 5A and 5B, the battery module 60 provides the advantage that the battery cells 11 can be disconnected on both sides from the remaining battery by means of the coupling unit 50, which renders it possible to replace said battery without risk during operation, since the dangerously high total voltage of the remaining battery modules of the battery is not available at any pole of the battery cells 11.

Figure 9:
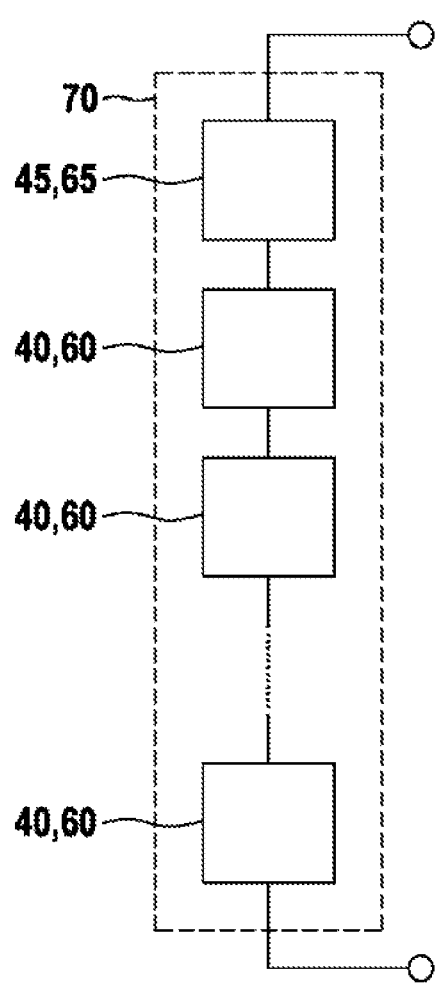
FIG. 9 shows a battery with which the method in accordance with the disclosure can be performed.

FIG. 9 illustrates an embodiment of a battery with which the method in accordance with the disclosure can be performed. The battery comprises a battery module string 70 having a plurality of battery modules 40 or 60, wherein preferably each battery module 40 or 60 comprises the same number of battery cells 11 that are connected in an identical manner. An additional battery module 45 or 65 is provided in addition to the battery modules 40 or 60, which additional battery module is embodied as the battery modules 40 and 60 respectively, but differs therefrom in that the number of battery cells 11 in the additional battery module 45, 65 is less than in the battery modules 40, 60. The additional battery module 45, 65 is indicated in FIG. 9 at the topmost position but it can be arranged at any position in the battery module string 70.

Figure 1:
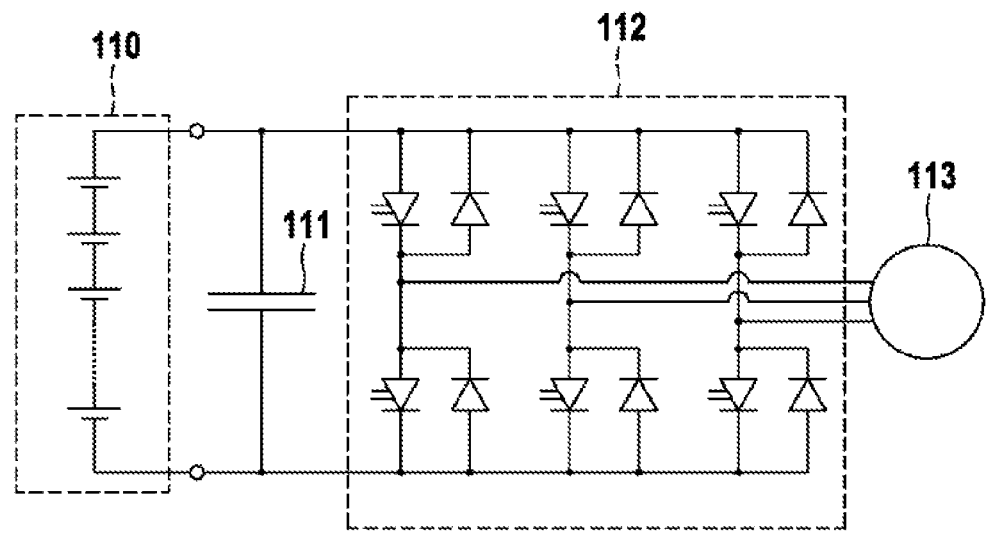
FIG. 1 shows an electric drive system in accordance with the prior art.
Figure 2:
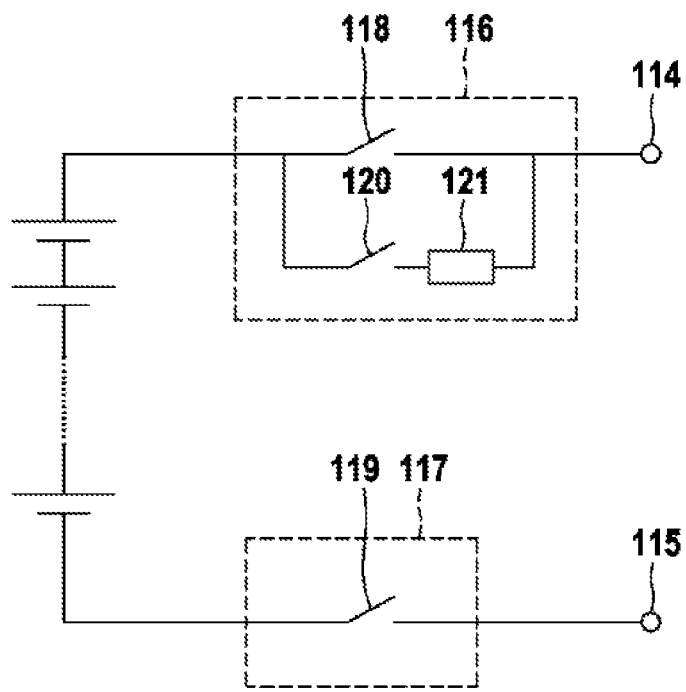
FIG. 2 shows a block diagram of a battery in accordance with the prior art.

Generally, the battery module string 70 can comprise any number of battery modules 40 or 60. It is also possible to provide at the poles of the battery module string 70 in addition charging and disconnecting devices and disconnecting devices such as illustrated in FIG. 2, if safety regulations require this. However, disconnecting devices of this type are not necessary in accordance with the disclosure because the battery cells 11 can be disconnected from the battery terminals by means of the coupling units 30 or 50 that are provided in the battery modules 40 or 60.

Figure 10A:
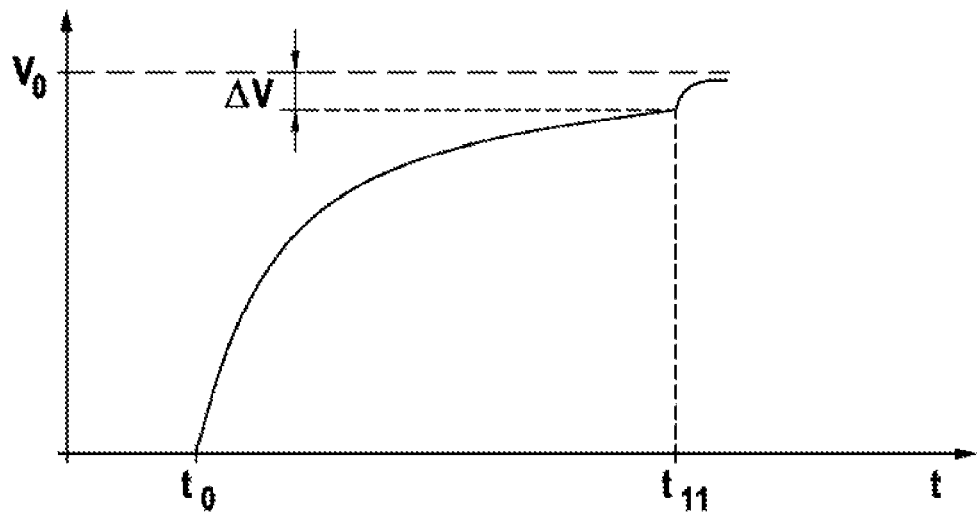
FIG. 10 shows graphs of the voltage of the DC voltage intermediate circuit for a battery system in accordance with the prior art and a battery system in accordance with the disclosure.
Figure 10B:
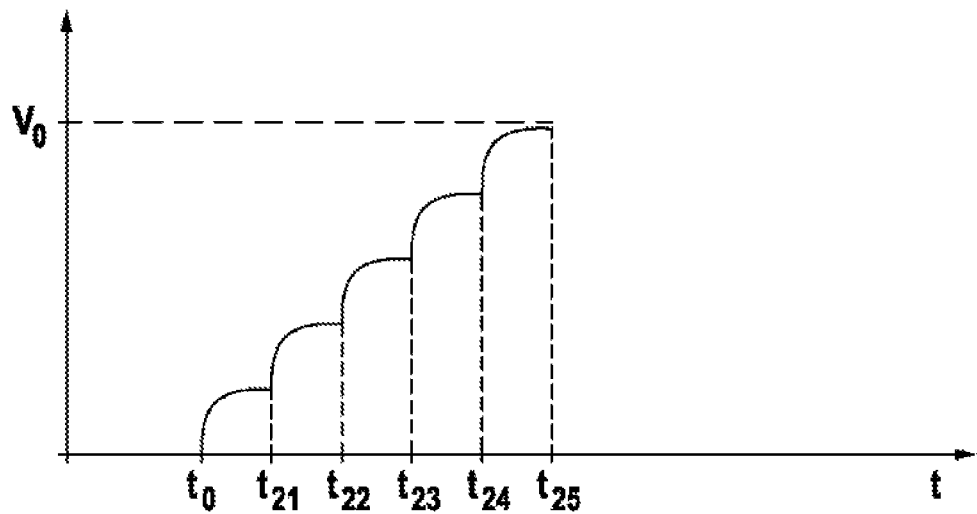

FIG. 10 illustrates graphs of the voltage of the DC voltage intermediate circuit for a battery system in accordance with the prior art and a battery system in accordance with the disclosure.

The partial figure a) illustrates the graph for a battery system in accordance with the prior art. At the point in time $t_0$, the battery is connected by way of the charging switch 120 and the charging resistor 121 to the capacitor 111 of the DC voltage intermediate circuit, wherein the latter is fully discharged at this point in time. The voltage of the DC voltage intermediate circuit rises initially rapidly but the increase then reduces continuously. Only at the point in time $t_{11}$ is the voltage of the DC voltage intermediate circuit of such a level that the difference $\Delta V$ between the output voltage of the battery and the voltage of the DC voltage intermediate circuit is sufficiently small in order to close the switch 118 and to charge the DC voltage intermediate circuit rapidly up to the output voltage of the battery without limiting the current by means of the charging resistor 121.

The partial figure b) illustrates the corresponding graph for a battery system in accordance with the disclosure. At the commencement of the charging process the voltage of the DC voltage intermediate circuit is in turn zero, in other words, the capacitor of the DC voltage intermediate circuit is fully discharged. The first battery module is activated at the point in time $t_0$, so that the output voltage of the battery corresponds to the voltage of the first battery module having the first number of battery cells. The charging current is not limited by a charging resistor, so that the voltage of the DC voltage intermediate circuit rapidly rises, however, the charging current is not inadmissibly high because the voltage difference between the output voltage of the battery and the voltage of the DC voltage intermediate circuit is comparatively small. As soon as the voltage of the DC voltage intermediate circuit approaches the level of the output voltage of the first battery module (point in time $t_{21}$) a second battery module having the higher second number of battery cells is activated and simultaneously the first battery module is in turn deactivated, as a consequence of which the output voltage of the battery increases to the voltage of the activated second battery module and by the difference between the voltage of the activated second battery module minus the voltage of the first battery module. The voltage of the DC voltage intermediate circuit in turn follows rapidly the output voltage of the battery. At the point in time $t_{22}$, the first battery module is in turn activated in addition to the already activated second battery module. If the voltage of the DC voltage intermediate circuit has again correspondingly increased (point in time $t_{23}$) then a second battery module is in turn connected and simultaneously the first battery module is deactivated. The process of connecting in each case a further second battery module and the process of alternately activating and deactivating the first battery module are then repeated for the period of time until the voltage of the DC voltage intermediate circuit achieves the desired operating voltage and accordingly all the second battery modules (and possibly in addition the first battery module) are activated. In the illustrated example, the battery comprises two second battery modules but naturally any number of second battery modules greater than or equal to 1 are possible.

The comparison of the two graphs of the voltage of the DC voltage intermediate circuit shows that the DC voltage intermediate circuit in accordance with the disclosure is charged considerably more rapidly than usual in the prior art. As a consequence, a drive system that is connected to the DC voltage intermediate circuit starts up more rapidly which is of particular interest for applications where safety is concerned.

The invention claimed is:

1. A method for starting up a battery system having a battery, a DC voltage intermediate circuit that is connected to the battery, and a drive system that is connected to the DC voltage intermediate circuit, the battery having a plurality of battery modules connected in series, each battery module having a first input, a second input, a coupling unit, and at least one battery cell, the coupling unit being configured to (i) in a first state, connect the at least one battery cell between the first input and the second input, and to (ii) in a second state, bridge the at least one battery cell by connecting the first input to the second input, the plurality of battery modules including a first battery module having a first number of battery cells and at least one second battery module having a second number of battery cells, the second number of battery cells being greater than the first number of battery cells, the method comprising:

a) operating the coupling units of all of the plurality of battery modules in the second state to bridge the at least one battery cell of each of the battery modules b) operating the coupling unit of the first battery module in the first state to couple the at least one battery cell of the first battery module between the first input and the second input of the first battery module;

c) operating the coupling unit of a second battery module of the at least one second battery module in the first state to couple the at least one battery cell of the second battery module of the at least one second battery module between the first input the second input of the second battery module of the at least one second battery module;

d) simultaneously with step c) operating the coupling unit of the first battery module in the second state to bridge the at least one battery cell of the first battery module; and e) repeating steps b) to d) provided that a further second battery module of the at least one second battery module has a coupling unit still in the second state such that the at least one battery cell of the further second battery module is bridged, each repetition of step d) using the further second battery module.

2. The method as claimed in claim 1, further comprising:
    starting up the drive system in response to a voltage of the DC voltage intermediate circuit reaching a predetermined operating voltage.

3. The method as claimed in claim 2, wherein the predetermined operating voltage is at least one of (i) less than a total voltage of all the second battery modules of the at least one second battery module and (ii) less than a total voltage of all the second battery modules of the at least one second battery module and the first battery module.

4. The method as claimed in claim 1, wherein the steps b) to d) are repeated until the at least one battery cell of all the second battery modules of the at least one second battery module are coupled between the corresponding first inputs and second inputs of all of the second battery modules.

5. The method as claimed in claim 1, wherein the second number is twice the first number.

6. The method as claimed in claim 1, wherein the DC voltage intermediate circuit is connected directly to the battery.

7. The method as claimed in claim 1, wherein the DC voltage intermediate circuit includes a capacitor.

8. The method of claim 1, wherein the battery system is included in a motor vehicle.

* * * * *